(12) United States Patent
Plopski

(10) Patent No.: US 7,276,148 B2
(45) Date of Patent: Oct. 2, 2007

(54) PROCESS FOR TREATMENT OF ORGANIC WASTE

(75) Inventor: Yafim Plopski, Beer Sheva (IL)

(73) Assignee: Bio-Petrol, Ltd., Kiryat Arba (IL)

( * ) Notice: Subject to any disclaimer, the term of this patent is extended or adjusted under 35 U.S.C. 154(b) by 115 days.

(21) Appl. No.: 10/533,415

(22) PCT Filed: Oct. 27, 2003

(86) PCT No.: PCT/IL03/00882

§ 371 (c)(1),
(2), (4) Date: Apr. 28, 2005

(87) PCT Pub. No.: WO2004/037730

PCT Pub. Date: May 6, 2004

(65) Prior Publication Data

US 2006/0151357 A1    Jul. 13, 2006

(30) Foreign Application Priority Data

Oct. 28, 2002    (IL) ..................................... 152513

(51) Int. Cl.
*B01J 29/70* (2006.01)
(52) U.S. Cl. .................... 208/46; 208/117; 208/428; 585/241
(58) Field of Classification Search ............ 208/46, 208/117, 428; 585/241
See application file for complete search history.

(56) References Cited

U.S. PATENT DOCUMENTS 4,089,773 A * 5/1978 Espenscheid ................ 208/428
5,865,956 A * 2/1999 Bridle et al. ................ 202/117

* cited by examiner

*Primary Examiner*—Glenn Caldarola
*Assistant Examiner*—Prem C. Singh
(74) *Attorney, Agent, or Firm*—Townsend and Townsend and Crew, LLP

(57) ABSTRACT

The invention provides a multi-stage process for the treatment of organic waste comprising drying said waste to reduce the water content to below 15%; subjecting said dried waste to a thermochemical liquefaction process in the presence of a recirculating solvent medium at a temperature of about 275° C. to 375° C. and a pressure of up to 10 atmospheres, thereby obtaining gaseous, liquid and solid products; separating the formed slurry product from condensable gas, water and other liquid fractions boiling out at up to 250° C.; transferring said slurry product obtained from thermal extraction from step c to a pyrolysis apparatus and treating the same at a temperature of about 350° C. to 500° C. to cause additional thermal destruction of unconvertible organic matter of feed material and heavy liquid fractions obtained is step c and their evaporation and removal from pyrolysis apparatus; separating vapor products from condensable oil products; vacuum distillation of oil products from step c for the removal of fractions having a boiling temperature of between 250° C. and 350° C.; and recirculating solvent medium for step b.

9 Claims, 10 Drawing Sheets

GLYCERIDES

CERIDES

STERIDES

LIPIDS

CARBOHYDRATES

CELLULOSE

PROTEINS (B)

PEPTIDIC CHAIN

LIGNIN (A)

4571
1000 ml Reactor with 4842 Controller
Head Mounted Valves

PROCESS FOR TREATMENT OF ORGANIC WASTE

FIELD OF THE INVENTION

The present invention relates to organic waste disposal technologies, and more specifically, to a multi-stage processing of sewage sludge into synthetic fuel and chemical products by means of a direct thermochemical liquefaction process.

BACKGROUND OF THE INVENTION

Sewage sludge is the thick, malodorous slurry left behind in a sewage treatment plant after its load of human and industrial chemical wastes have been bio-chemically treated and the wastewater discharged.

The large amount of human waste in sewage treatment plants means that the sludge contains high concentrations of phosphates and nitrates, desirable components of fertilizer. However, the industrial wastes that are present in sewage cause highly toxic materials such as industrial solvents, heavy metals, and even nuclear waste to be left behind in sludge. When sewage sludge is applied to the fields, both the nutrients and the toxic chemicals are released to the environment. There are many of these toxic chemicals, and they are often found at high concentrations.

Sewage sludge solids comprise a mixture of organic materials composed mainly of crude proteins, lipids and carbohydrates, and inorganic materials, comprising significant quantities of silt, grit, clay and lower levels of heavy metals. In addition the bacteria still alive are pathogenic and may contaminate soils and subsequently ground water. A typical raw sewage sludge comprises about 60-80% volatile material, and contains about 25-40% organic carbon (Table 1). Disposal of the sludge is expensive and normally constitutes up to 50% of the total annual costs of wastewater treatment. The major sludge disposal options currently used include agricultural utilization, land-filling and incineration (See FIG. 1);

TABLE 1

Activated Sludge Characteristics

| Characteristic | Range of values | Typical value | Comments |
|---|---|---|---|
| pH | 6.5-8.0 | — | Can be less in purity oxigen systems or if anaerobic decomposition begins. |
| | | 5.5 | Baltimore, Maryland |
| Heating value, Stu/lb, (Kj/kg) | — | 6,540 (15,200) | Increases with percent volatile content. |
| Specific gravity of individual solid particles | — | 1.08 | |
| Bulk specific gravity | — | $1.0 : 7.0 \times 10^{-1} \times C$ | C is suspended solids concentration, in mg/l. |
| Color | — | Brown | Some grayish sludge been noted. Activated sludge becomes black upon anaerobic decomposition. |
| Carbon/Nitrogen ratio | — | 12.9 | Baltimore, Maryland |
| | — | 6.6 | Jasper, Indiana |
| | — | 14.6 | Richmond, Indiana |
| | — | 5.7 | Southwest plant, Chicago, Illinois |
| | — | 3.5 | Milwaukee, Wisconsin (heat dried) |
| Organic carbon, percent by weight of dry solids | 17-41 | — | Zurich, Switzerland |
| | 23-44 | — | Four plants |
| Nitrogen, percent by weight of dry solids (expressed as N) | 4.7-6.7 | — | Zurich, Switzerland |
| | — | 5.6 | Chicago, Illinois |
| | 2.4-5.0 | — | Four plants |
| | — | 6.0 | Milwaukee, Wisconsin |
| Phosphorus, percent by weight of dry solids as $P_2O_3$ (divide by 2.29 to obtain phosphorus as P) | 3.0-3.7 | — | Zurich, Switzerland |
| | — | 7.0 | Chicago, Illinois |
| | 2.8-11.0 | — | Four plants |
| | — | 4.0 | Milwaukee, Wisconsin |
| Potassium, percent by weight of dry solids as $K_2O$ (divide by 1.20 to obtain potassium as K) | 0.5-0.7 | — | Zurich, Switzerland |
| | — | 0.56 | Chicago, Illinois |
| | — | 0.41 | Milwaukee, Wisconsin |
| Volatile solids, percent by weight of dry solids (percent ash is 100 minus percent volatile) | 61-75 | — | Zurich, Switzerland |
| | — | 63.0 | |
| | 62-75 | — | |
| | 59-70 | — | Four plants |
| | — | 76.0 | Renton, Washington (Seattle Metro), 1976 average |
| | — | 88.0 | San Ramon, California (Valley Community Services District). 1975 average |
| Volatile solids (continued) | — | 81.0 | Central plant, Sacramento County, California, July 1977-Juni 1978 average |
| Grease and fat, percent by weight of dry solids | 5.0-12.0 | — | Ether extract |
| Cellulose, percent by weight of dry solids | — | 7.0 | Includes lignin |
| Protein, percent by weight of dry solids | 32-41 | — | — |

Wastewater treatment plants therefore currently are designed to minimize sludge production and all efforts are taken to stabilize and reduce its volume prior to disposal or utilization. Furthermore, increasing sludge disposal costs and diminishing landfill capacities are continually driving interest in sludge drying. As drying reduces the bulk and weight of sludge, transport and disposal costs are significantly alleviated. Drying process is highly energy consuming and hence very expensive.

Numerous sludge processing options have been proposed and have the potential to convert a fraction of organic material into usable energy, but only a few have been demonstrated to be viable net energy produces at full scale. Anaerobic digestion of sewage sludge is probably the most common process employed to date, about 25% of the available organic materials being converted to produce a gas rich in methane, resulting in an energy production of about 5 MJ/kg of dry sludge solids fed to the digester. Other alternatives, such as air incineration, gasification and liquefaction have recently been reported as viable technologies for net energy production from sewage sludge, mostly to process woody and lignite agricultural wastes. Very scant information on high nitrogen containing sludges.

The idea to use the processes of synthetic oil production from solid fuels for the treatment of various organic wastes, sewage sludge included, is based on the similarity of the chemical composition of the organic matter of these fuels and that of the waste products. Table 2 shows the elemental composition of various hydrocarbon sources and other substances present in diverse organic waste, including sewage sludge (lipids, proteins, hydrocarbons).

As can be seen from Table 2, all organic substances listed in it are composed of the same five elements in different concentrations. They differ in the structure and mass of their molecules. FIG. 2 shows the molecular models of the structure of an organic matter of bituminous coal, lignin (a natural polymer, which is a component of the wood structure) and organic components of the sewage sludge structure. It can be seen that the molecules under discussion are basically similar in structure. They consist of ring-shaped aromatic and hydroaromatic nuclei both single and condensed, linked by aliphatic or hetero-atomic cross-links. Since such links have low energy of formation, they are the first to be destroyed by thermal treatment, and radical fragments are formed. The more said cross-links there are in the structure of the material and the lower the energy of such links, the lower the temperature of their destruction point and the smaller the fragments they break into.

The newly-formed fragments are chemically active radicals which in the absence of hydrogen combine (recombine) into heavy products and coke. With hydrogen from any source present, oil molecules are formed. FIG. 3 illustrates the above, which holds true for any solid fuel, including the organic matter of sewage sludge.

TABLE 2

Variation in Elemental Composition of Different Types of Organic Matter. The process of obtaining synthetic oil from any solid organic feed stock consists of two basic stages:

| Type of organic matter | Elemental composition, % wt daf | | | | | |
| --- | --- | --- | --- | --- | --- | --- |
|  | C | H | N | S | O | H/C |
| Metane | 87.5 | 12.5 | — | — | — | 1.7 |
| Crude oil | 84.0-87.0 | 11.0-14.0 | 0.1-0.3 | 0.5-3.5 | 1.0-3.0 | 1.5-1.9 |
| Coal | 66.0-86.0 | 5.7-7.0 | 0.5-1.9 | 0.4-3.5 | 8.0-29.0 | 0.9-1.3 |
| Oil shale (kerogene) | 62.0-80.0 | 7.5-10.0 | 0.5-2.5 | 1.0-1.4 | 6.0-15.0 | 1.1-1.4 |
| Peat | 49.0-60.0 | 5.0-8.0 | 1.0-4.0 | 0.1-1.0 | 28.0-48.0 | 0.9-1.9 |
| Wood | 48.0-52.0 | 5.8-6.2 | 0.1-1.5 | — | 40.0-45.0 | 1.4-1.5 |
| Cellulose | 44.4 | 6.2 | — | — | 49.4 | 1.7 |
| Lignin | 63.0 | 6.0 | — | — | 31.0 | 1.1 |
| Fats | 76.0-79.0 | 11.0-13.0 | — | — | 10.0-12.0 | 1.7-2.0 |
| Albumines | 50.0-55.0 | 6.5-7.5 | 15.0-18.0 | 0.3-2.5 | 21.5-23.5 | 1.7-1.8 |
| Sewage sludge | 23.0-44.0 | 4.5-6.0 | 2.5-7.5 | 0.3-1.8 | 16.0-24.0 | 1.2-1.7 |

Thermal cleavage of the macromolecular structure, with radical fragments of different size formed;

Stabilization of said radicals either through their recombination or through redistribution of hydrogen and alkyl groups in the feed stock structure, or through external introduction of hydrogen (molecular or donor).

It follows from the above that all thermochemical processes of obtaining synthetic oil essentially differ only in the methods by which the formed radical fragments are stabilized:

By pyrolysis—through redistribution of the hydrogen in the organic matter of the feed stock;

By hydropyrolysis and hydrogenation—through external, introduction of molecular hydrogen;

By thermal: extraction—at the expense of donor hydrogen from the recirculating solvent.

The advantage of the thermal extraction process as compared to other processes mentioned above is that the recirculating solvent contains components, which easily looses hydrogen (H-donors) at temperatures of the process. This donor hydrogen splits off the active atomic form and quickly and easily reacts with the radical fragments, stabilizing them in the form of liquid products.

FIG. 4 illustrates the importance of the presence of substances, which act as hydrogen donors in the recirculating solvent and the principle of their interaction with the feedstock during the liquefaction process.

The naphtalene tetraline decaline transformation activate the hydrogen at much lower temperatures (e.g. 200° C.)

Due to said advantage, the thermal extraction process yields twice as much liquid products as pyrolysis.

One of the major problems in direct solid fuels liquefaction processes is the separation of solids, mineral matter and unconverted organic matter from liquefaction products. Solid/liquid separation processes must be used to separate the mineral residue and unconverted carbon from liquid products. Difficulties in removing these solid components represent a major obstacle to economic production of liquefied feedstocks products.

Filtration, centrifugation, sedimentation, hydrocloning and screening are all methods for mechanical separating solid particulates from slurries. Thereto, other methods have been sought to solve the problem: vacuum distillation and extraction methods were used to separate liquid products from solid residue. The removal of the micron-sized particles is difficult to achieve. One-way of proceeding is as follows: the viscosity is decreased by blending with a relatively high amount (about 40-60% wt) of a low viscosity liquid solvent so that the separation of the solids by centrifugation or filtration becomes possible. At a subsequent stage of the process, the solvent is recovered by distillation. However, centrifuges wear out quickly when used for the separation of the micron-sized particles. Filters are rapidly clogged by the fine material and have to be changed frequently, thereby making the process tedious and costly.

The main shortcoming of the separation methods mentioned above is that none of them ensures complete separation of the liquid products from the solid residue: 25-40% wt of the oil obtained in the liquefaction process remains absorbed in the pores of the solid residue.

At the same time, it is known that during solid fuel pyrolysis, both the liquid and the gaseous products of the process leave the reactor in the vapor phase and are thus separated from the solid residue. The offered invention makes use of this advantage of pyrolysis to separate the liquid products that are formed at the stage of thermal extraction of the feedstock.

Proceeding from what is described hereinbefore, the processes used for liquefying solid fossil fuels may be used to obtain liquid synthetic products from organic waste, sewage sludge included.

An example of thermal gasification system has been proposed by S. A. Virgil and G. Tchobanoglous in a paper entitled, "Thermal Gasification of Densified Sewage Sludge and Solid Waste," presented at the 53$^{rd}$ Annual Water Pollution Control Federation (WPCF) Conference at Las Vegas, Nev. USA in October 1980, while a laboratory scale system for liquifaction was disclosed at the above-mentioned Hartford Conference in a paper by P. M. Molton entitled, "Batelle Northwest Sewage to Fuel Oil Conversion," consisting of alkaline pretreatment of the sludge and subsequent atoclaving at 320° C. for one hour at about 10,000 kPa under an argon atmosphere. This last process produces oil, asphalt and char with reported oil yields of up to 15% by weight of total sludge solids, total thermal efficiency of up to 70%, and net energy production of about 5.9 MJ/kg, the latter figure being based on the assumption that the oil represents the net energy.

In another process described by W. L. Kranich, K. Guruz, and A. H. Weiss in a paper entitled, "Hydroliquefact of Sewage Sludge," published in the Proceedings of the National Conference on Municipal and Industrial Sludge Utilization and Disposal," Washington, D.C., USA, May 1980, both raw and digested dry sludge were processed with a carrier oil in an autoclave at temperatures ranging from 396° C.-420° C. under gydrogen at 10,000-13,000 kPa. Oils and asphaltenes were produced, with oil yields of up to 30%.

A process for the conversion of sewage sludge to produce oils has been disclosed in European Patent Application No. 81109604.9 filed Nov. 10, 1981 by Prof. Dr. Ernst Bayer and published May 26, 1982 (Pub. No. AZ 0 052 334), and has been described by E. Bayer and M. Kutubuddin of Tubingen University, Federal Republic of Germany, in several articles, for example in "Q1 aus Mull and Schlamm" at pages 68-77 of Bild der Wissenschaft, Issue 9 (1981); in "Q1 aus Klarschlamm" at pages 377-381 of Abwasser, Issue 29 (1982); and in "Low Temperature Conversion of Sludge and Water to Oil" in the Proceedings of the International Recycling Congress, 1982, Berlin, Federal Republic of Germany. The process has been demonstrated on both batch and continuous laboratory scale systems, and basically comprises heating dried sludge slowly with the exclusion of air to a conversion temperature of 28.0° C.-600° C. for about 30-180 minutes, the vapours being condensed to generate a crude oil and the solid reidue about 30-180 minutes, the vapours being condensed to generate a crude oil and the solid residue being coal-like. Significant advantages of the process are stated to be that it can be operated at only slightly above atmospheric pressure and no additives are required, the developers postulating that catalysed vapour phase reactions occur in which the organic materials are converted to straight chain hydrocarbons, much like those present in crude oil. Analysis of the product is stated to confirm that aliphatic hydrocarbons are present in contrast to other known oil-producing processes, which appear to tend to produce aromatic and cyclic compounds, whether utilizing sludge, cellulose or refuse as the substrate. The developers state that they have demonstrated oil yields ranging from 18-27% and char yields from 50-60%, the oil having a heating value of about 39 mj/kg and the char of about 15 MJ/kg. Energy balance calculations indicate that the process is a net producer of energy, provided that the sludge is first mechanically dewatered to about 20% solids, and it has been estimated that a net energy production of 10-15 MJ/kg solids could be obtained in a full-scale process.

This Bayer process is simple and in effect, mimics the natural process of oil synthesis. It is known that natural crude oil was formed from microscopic organisms over geologic periods of time, and comprises a mixture of saturated and unsaturated hydrocarbons including some non-hydrocarbon material. It is postulated by Bayer that at the low levels of energy input used, with the exclusion of oxygen, the proteins and lipids in the sludge are converted to oil and the carbohydrates to the coal-like material, the process being catalyzed if necessary by the addition of suitable materials. It is stated that in the case of sewage sludge it is in most cases superfluous to add a catalyst material, since the inorganic components present in the sludge contain a sufficient amount of catalyst in the form of silicates, aluminum compounds and transition metals. The heterobonds (C-$, C—N, C—P, C—O) are broken, but not the C—C bonds, resulting in a hydrocarbon mix very similar to natural crude oil. The research indicated that the maximum oil yield was achieved at an operating temperature of 280° C. to 320° C.

In a solid waste treatment process disclosed in U.S. Pat. No. 3,714,038, issued Jan. 30, 1973 to the Black Clawson Company, a slurry is formed of a mixture of the organic and inorganic wastes, and the inorganic materials are then removed. The slurry is dewatered and pyrolyzed or hydrogenated to result in a series of products such as gas, oil, char and residue.

U.S. Pat. No. 3,962,044, issued Jun. 8, 1976 to the Regents of the University of California, proposes a process for the treatment of solid animal and human excreta by particulating and heating it in a closed heating zone at 200° C.-1000° C. (300° C.-600° C. preferred) for a period of 15-120 minutes, when a part is volatilized and the solid residue is carbonized. The volatilized portion is removed to a recovery zone and condensables are condensed therefrom, it being separated into aqueous, non-aqueous and non-condensable fractions.

U.S. Pat. No. 4,030,981 issued Jun. 21, 1977 to H. V. Hess, W. F. Framg amd E. L. Cole, describes processes for making low sulphur oil by coking wastes, one of which is sewage sludge, at temperatures of 400° F.-550° F. pressures of 300-3000 p.s.i.g., and times of 5 minutes to 2 hours and thereafter reacting the coked waste with hot pressurized synthesis gas (carbon monoxide and hydrogen), the synthesis gas reaction employing temperatures of 500° F.-750° F. and pressures of 500-5000 p.s.i.g.

U.S. Pat. No. 4,098,649, issued Jul. 4, 1978 to Redken-Young Processes Inc. describes a process for destructive distillation of organic material separated, for example by flotation, from idndustrial and municipal wastes in which the material is delivered to a screw extruder conveyor which is heated to different temperatures in succeeding zones along its length, for example 40° F.-600° F. in a first zone and up to 1500° F. in subsequent zones, the resultant char being discharged. The gaseous products are removed separately from the different zones and separated, and may include olefins and paraffins.

U.S. Pat. No. 4,210,491 issued July 1, 180 to Tosco Corporation also proposes the use of a screw conveyor as a retort for converting substances containing organic material into hydrocarbon vapours and solid residue, the volatile materials being removed at different points along its length and subsequently processed. The retort conveyor is heated by a fluidized bed.

U.S. Pat. No. 4,344,770 issued Aug. 17, 1982 to Wilwardco Inc. discloses a process and appartus intended principally for the hydrolysis treatment of sawdust and wood chips, but applicable also to sewage sludge. The separated gases are condensed to liquid and gas phases and the liquid phase is then separated by gravity into water and oil fractions. The water fraction is distilled to separate water-soluble oils and they are added to the oil fraction to increase its energy content.

Canadian Patent No. 1,075,003 issued Apr. 8, 1980 to Karl Klener describes a process for the production of combustible gas from waste materials, including sewage sludge, requiring drying of the material, its carbonization at low temperature (300° C.-600° C.) in a first series of rotary tubes, separation of the resultant combustion components and conversion of the low temperature carbonization gases in a reaction bed of solid carbon at high temperature (1000° C.-1200° C.).

Canadian Patent No. 1,100,817, issued May 12, 1981 to Ahlstrom (A.) Osakeyhtiz discloses a method of treating material, such as sewage sludge, in a fluidized bed reactor for its incineration, the process employing mechanical dewatering to achieve a high enough solids content for the process to be autogenous and not to require supply of auxiliary fuel. It is not always possible to remove sufficient water mechanically and the thus-dried material is fed first into a pre-reactor into which is passed hot separated solids removed from the flue gases from the main fluidized bed reactor, these hot solids being mixed thoroughly with the sludge in the pre-reactor to heat and dry it before it passes to the main reactor.

Canadian Patent No. 1,001,493, issued Dec. 14, 1976 to Phillips Petroleum Company, USA discloses a two-stage incinerator for waste products, such as sewage sludges. In the first stage vaporization or volatilization is achieved with some combustion occurring, and then all the gaseous products are conducted to a second stage in which further oxidation and combustion occurs, the hot flue gases from the second stage being quenched with cool air to provide preheated air for the combustion in either or both of the two stages.

U.S. Pat. No. 4,618,735 issued Oct. 21, 1986 to T. R. Bridle and H. W. Campbell disclosed a new process for the conversion of the organic components of sludge, particularly sewage sludge, to produce useful, storable, energy-containing oil products, apparatus for carrying out the process and a control process for optimization of the process temperature. The sludge preferably is mechanically dewatered to about 20-25% solids by weight and thermally dried to about 90% solids by weight. The resultant material is comminuted and heated in the apparatus of the invention to at least 250° C. in a heating zone in the absence of oxygen to generate a gaseous atmosphere containing volatiles; this atmosphere is then removed, scrubbed of $H_2S$ and $NH_3$ if required, and passed preferably in coutercurrent flow in a heated reaction zone in intimate contact with the "devolatilized" sludge solids from the heating zone, again in the absence of oxygen, at a temperature of at least 280° C., resulting in catalyzed vapor phase oil-producing reactions. The oil vapors are carried out by the gas flow and condensed.

The preferred apparatus moves the sludge solids cocurrent with the heating zone atmosphere and countercurrent with the reaction zone atmosphere. In the reaction zone the conveyor not only moves the comminuted sludge along but lifts it and drops it through the gaseous atmosphere of the preferred intimate contact. Preferably the sludge is examined repeatedly by differential scanning calorimetry to generate a thermogram, which has been found to reveal immediately the optimum temperature for operation of the reaction zone, and also the anticipated oil yield from the sludge.

A practical problem with many of the processes proposed and employed hitherto, particularly those involving pyrolysis and incineration, is that the principal usable energy-containing products are gases, often not easily condensable, and of low net energy content, so that they are impossible or uneconomic to store and must be used immediately. Generally it is only practicable to use them to produce relatively low grade energy, such as steam, and flare them to waste during periods of little or no demand. There is a growing demand for processes that result in storable (liquid or liquifiable), transportable and if possible upgradable energy or chemicals containing products, such as synthetic oils, with efforts directed to the optimum production of net storable energy or fine chemicals and with the non-storable products, if used at all, used in the operation of the process.

BRIEF DESCRIPTION OF THE INVENTION

The present invention involves a combined thermal extraction pyrolysis two stage processes for the conversion of sludges, particularly sewage sludges by heating and chemical reaction, in order to obtain useful storable products therefrom, such as oils in yields greater than that obtained in only pyrolysis process.

This aim is achieved by transferring the slurry product obtained at the stage of thermal extraction at temperatures of up to 350° C. for second-stage treatment. Following the separation of non-condensable gases, water and light fractions ($\leq 250°$ C.), the slurry product is transported to the pyrolysis reactor where, in zones of temperatures ranging from 350° C. to 500° C. and distributed along the length of the reactor chamber, the organic matter of the feed stock that has not reacted is further destroyed, and the heavy components of the liquid products obtained at the thermal extraction stage undergo secondary decomposition. In this manner, first, the yield of light and medium fractions of oil and of gas is increased, and, second, the technological problem of separating the liquid products from the solid residue is solved; said products leave the pyrolysis reactor in the vapor phase, which is condensed in an additional separator.

The liquid products separated at the second stage are transferred to vacuum distillation where products boil at temperatures of up to 350° C. are separated and the residue of heavy products >350° C. is directed as recirculating solvent to the stage of feed slurry preparation.

More particularly, the present invention provides a multistage process for the treatment of organic waste comprising:
One) Drying said waste to reduce the water content to below 15%,
Two) Subjecting said dried waste to a thermochemical liquefaction process in the presence of a recirculating solvent medium at a temperature of about 275° C. to 375° C. and a pressure of up to 10 atmospheres, thereby obtaining gaseous, liquid and solid products;
Three) Separating the formed slurry product from condensable gas, water and other liquid fractions boiling out at up to 250° C.;
Four) Transferring said slurry product obtained from thermal extraction from step c to a pyrolysis apparatus and treating the same at a temperature of about 350° C. to 500° C. to cause additional thermal destruction of unconvertable organic matter of feed material and heavy liquid fractions remaining in step c and their evaporation and removal from pyrolysis apparatus;
Five) Separating vapor products from condensable oil products;
Six) Vacuum distillation of oil products from step e for the removal of fractions having a boiling temperature of between 250° C. and 350° C.; and
g) Recirculating a fraction having a boiling temperature of above 300° C. as the recirculating solvent medium for step b.

In preferred embodiments of the present invention said recirculating solvent medium is in itself a liquid product with a boiling temperature of above 300° C.

In further preferred embodiments of the present invention, step g is carried out by recirculating a fraction having a boiling temperature of above 350° C. as the recirculating solvent medium for step b.

As explained herein in preferred embodiments of the present invention said recirculating solvent medium serves as a hydrogen donor in step b.

In especially preferred embodiments of the present invention said organic waste is sewage sludge.

Preferably in the process of the present invention said waste is dried to reduce the water content to below 12%.

In especially preferred embodiments of the present invention the ratio of solvent to dried sewage sludge is preferably between 0.75:1 and 1.5:1 and most preferred is a ratio of about 1:1.

As will be realized, if desired or necessary, further solvent can be added to the fraction from step g to achieve said ratios.

DETAILED DESCRIPTION OF THE INVENTION

For purposes of this invention sewage sludge liquefaction is conducted in two separate stages: the first stage is thermal extraction in a recirculating solvent medium wherein said solvent performs several functions:

Formation of slurry, which facilitates the pumping of the feed stock through the apparatus;
Improvement of the heat transfer from the heating agent to the feed stock;
Hydrogen donation in order to recombine the radical fragments formed during the thermal destruction of organic molecules in the feed stock;
Dissolution of the resulting fragments in the liquefaction medium.

The presence of the recirculating solvent thus makes for a higher yield of liquid products compared with the processes of pyrolysis known in the literature (see previous section), and for a lower temperature of the treatment (pyrolysis at 450° C.-550° C., thermal extraction at 250° C.-350° C. for sewage sludge).

The slurry product obtained at the first stage after separating the non-condensed gases, water and light fractions of the liquid product is a mixture of spent sewage sludge bearing unconverted organic matter, liquid recirculating solvent and newly formed liquid products. Complete separation of the liquid part of the mixture from the solid spent sewage sludge is virtually unattainable technologically since the known solid/liquid separation methods, such as filtering, centrifuging, vacuum distilling, etc., all fail to achieve complete separation. Approximately 25-35% wt of liquid products remains absorbed in the pores of the spent sewage sludge particles.

To obtain complete separation and additional yield of liquid products, this invention offers a method wherein after the first stage of liquefaction the slurry product is directed into a pyrolysis reactor with the temperature in said reactor gradually rising along the length of the chamber from 350° C. to 550° C., which makes it possible to achieve the following objectives:

Transformation of the liquid products into the vapor phase and their evacuation from the reaction zone;
Further decomposition of the unconverted organic matter and of the heavy fractions of liquid products obtained at the first stage, said process yielding additional light and medium fractions of liquid and gas products.

In accordance with the present invention, a process is provided for conversion of sludge, particularly sewage sludge, comprising the following steps (FIG. 5):

1. Feed slurry preparation, which includes dewatering of sewage sludge by a known technology (for instance, offered by the US Filter firm), with gaseous, solid and, if necessary, part of the liquid products of the process offered in this invention being used as fuel to obtain heating agents; comminuting said dewatered sewage sludge and mixing it with the recirculating solvent into a homogeneous slurry.
2. Heating said slurry in the reactor at temperatures from 275° C. to 360° C. and pressure of up to 1.0 MPa (10.0 atm), for the purposes of thermal extraction. This is essentially breaking up the sewage sludge organic matter into radical fragments, stabilizing said radical fragments at the expense of donor hydrogen from the solvent and subsequently removing them in vapor and liquid phases.
3. Product separation at the thermal extraction reactor output is actually separation of water, of the liquid product fraction with final boiling point at 250° C. and non-condensable gaseous products.
4. Pyrolysis of the reaction mass remaining in the thermal extraction reactor after treatment as per step 3, at temperatures from 350° C. to 550° C. (for the most part 450° C.-500° C.) with separating products in the vapor phase.
5. Removing the pyrolysis reaction vapor products and separating at least the condensable oil products and uncondensable gases, as well as removing spent sewage sludge solid residue.
6. Vacuum distillation of oil products from step 5 for the removal of product fraction 250° C.-350° C.
7. Recirculating the remaining fraction >350° C. (as recirculated solvent) of step 6 to step 1 (to feed slurry preparation).

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

Figure 1:
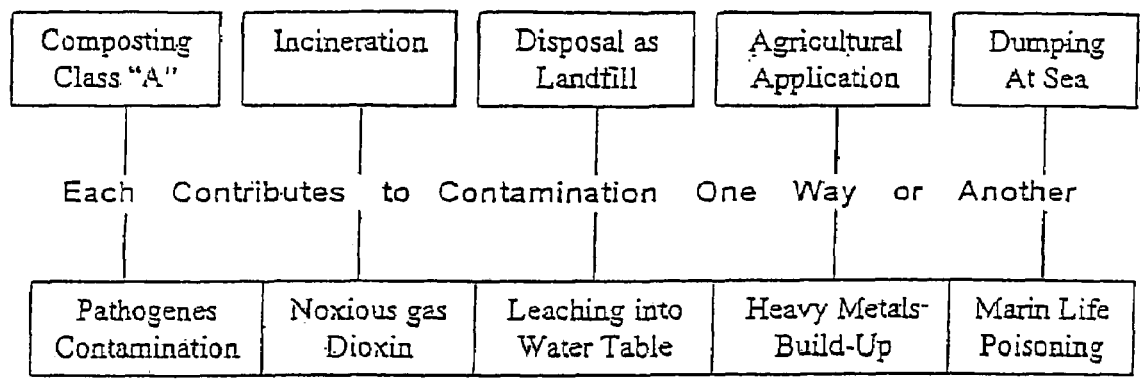
FIG. 1 is a schematic representation of ways of disposing of sludge material and their disadvantages.
Figure 2A:
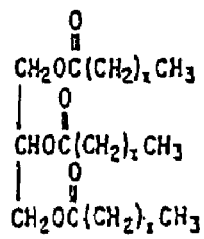
FIG. 2 shows molecular models of the structure of bituminous coal, lignin and organic components of sewage sludge.
Figure 2A:
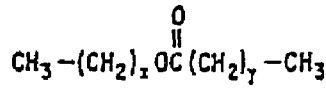
Figure 2A:
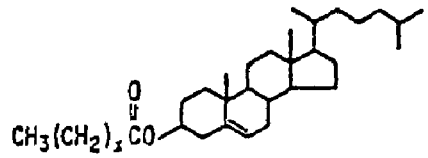
Figure 2A:
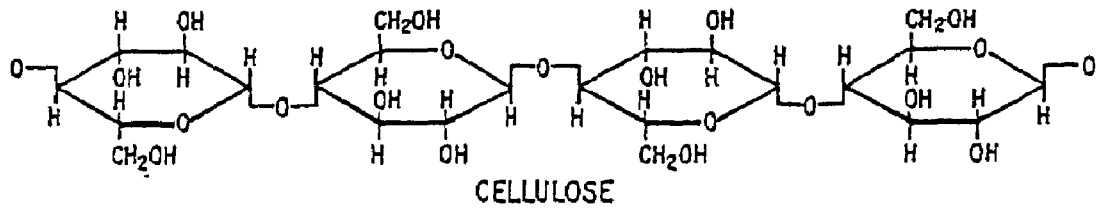
Figure 2A:
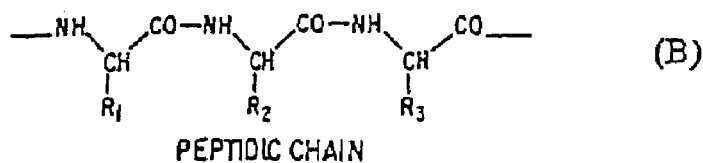
Figure 2A:
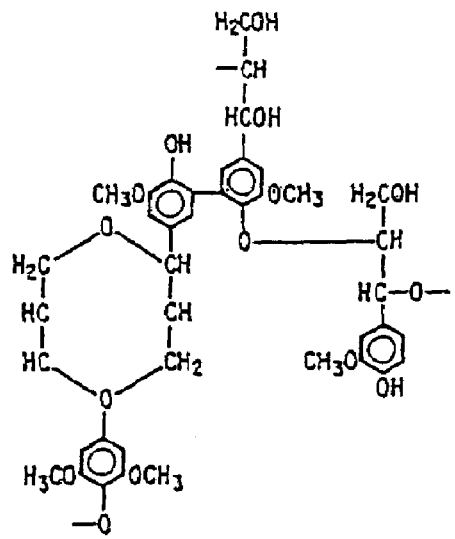
Figure 2B:
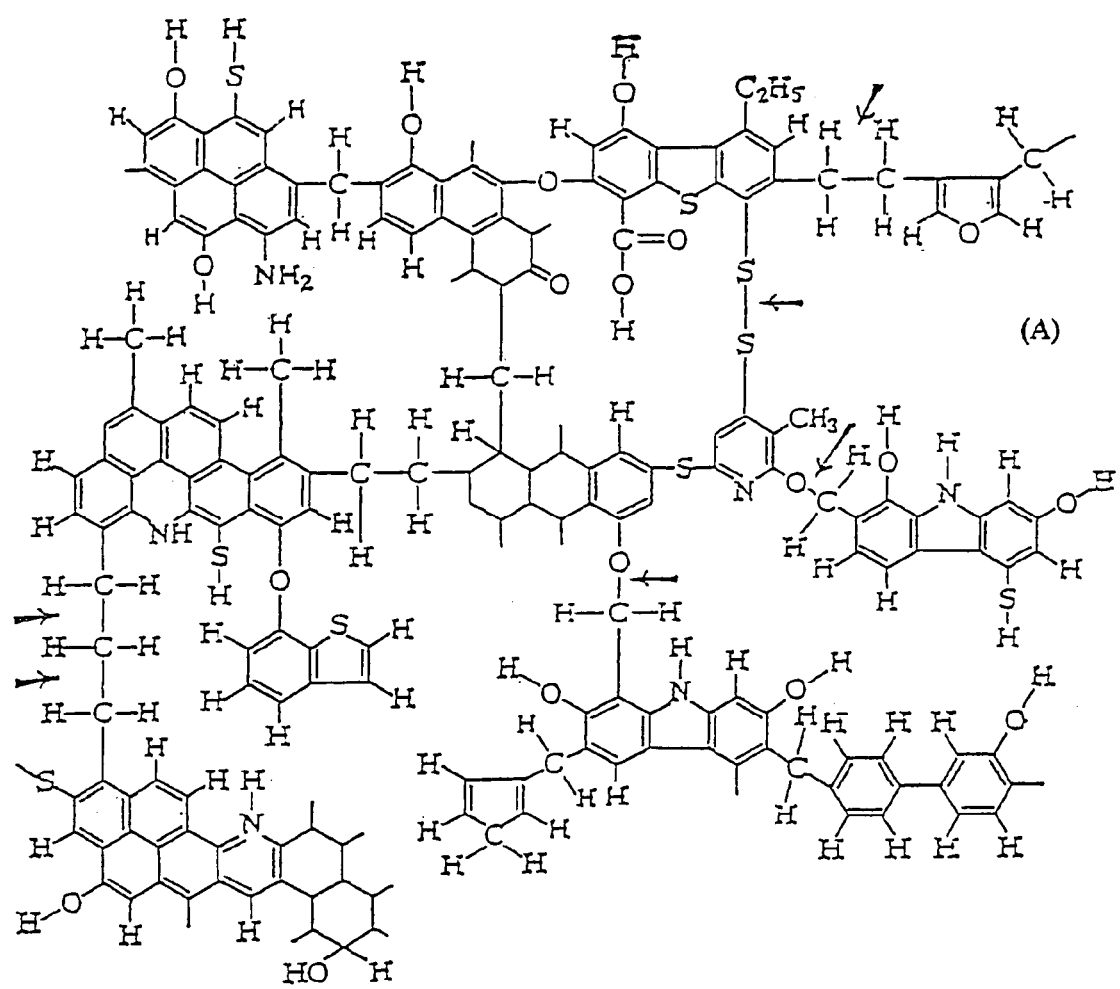
Figure 3:
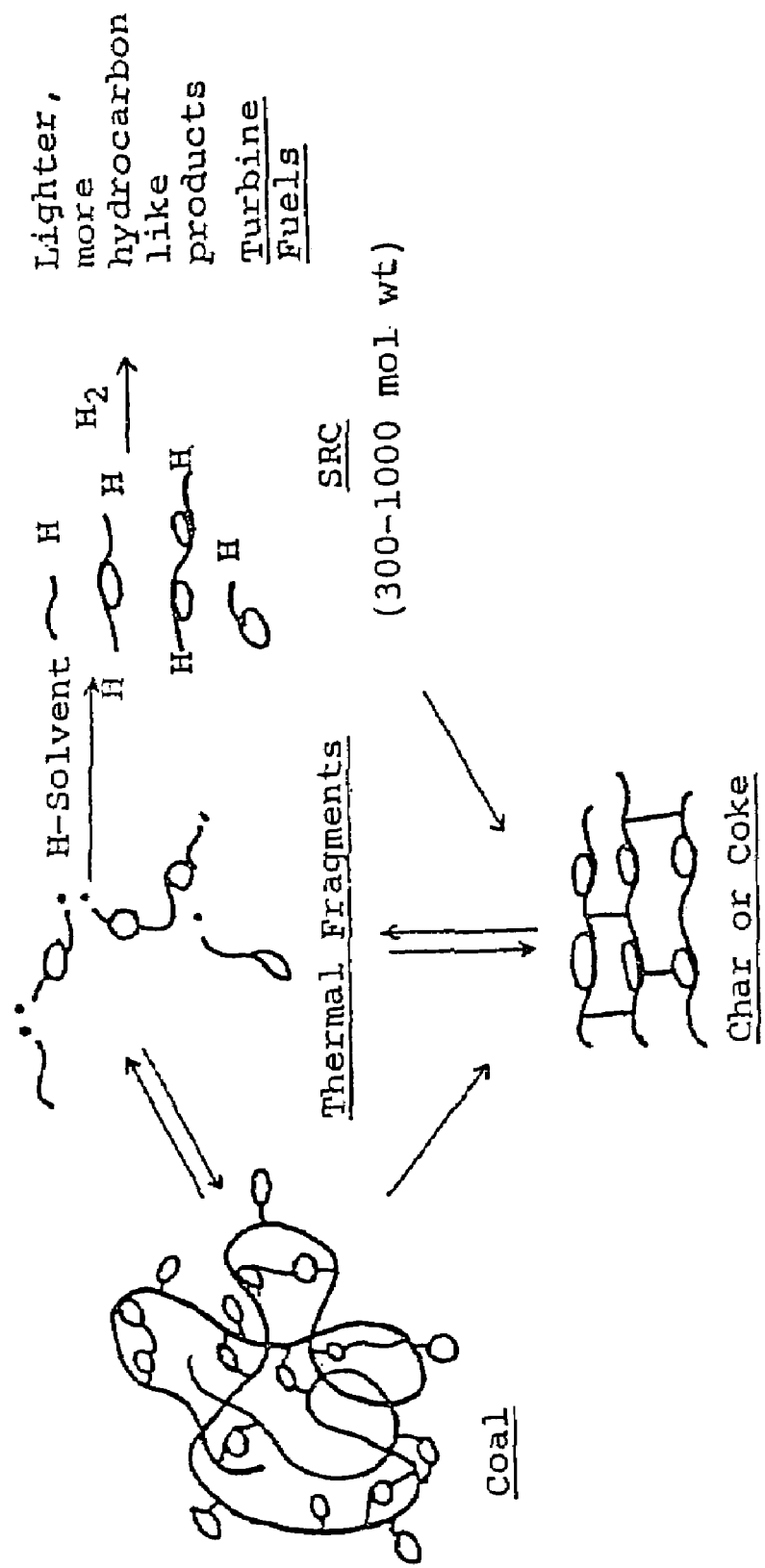
FIG. 3 is a representation of the chemistry in solid fuel conversion.

Once the homogeneous slurry is obtained, feed pump 3 is activated, which transports the feed-slurry into reactor 4, already preheated to set reaction temperature with the aid of fluidized bed sand bath 5. The flow rate is set by adjusting feed 3 pump, while pressure in the system during the experiment is set by blowing with gaseous nitrogen and sustained by back pressure regulator 9.

After passing through the reactor, the reaction mixture goes to cooler 6, which is cooled by running water, and then collected in separator vessel 7 where it is cooled completely. The non-condensable gases then leave separator vessel 7, pass through cold trap 8, where liquid fractions captured by the gas flow are trapped and thrown out of gasometer 10 to vent. Slurry preparation vessel 1 and separator vessel 7 are installed on scales, and the gasometer is equipped with a gas sampler, which makes it possible to receive data for substance balance at the end of the experiment.

Figure 8:
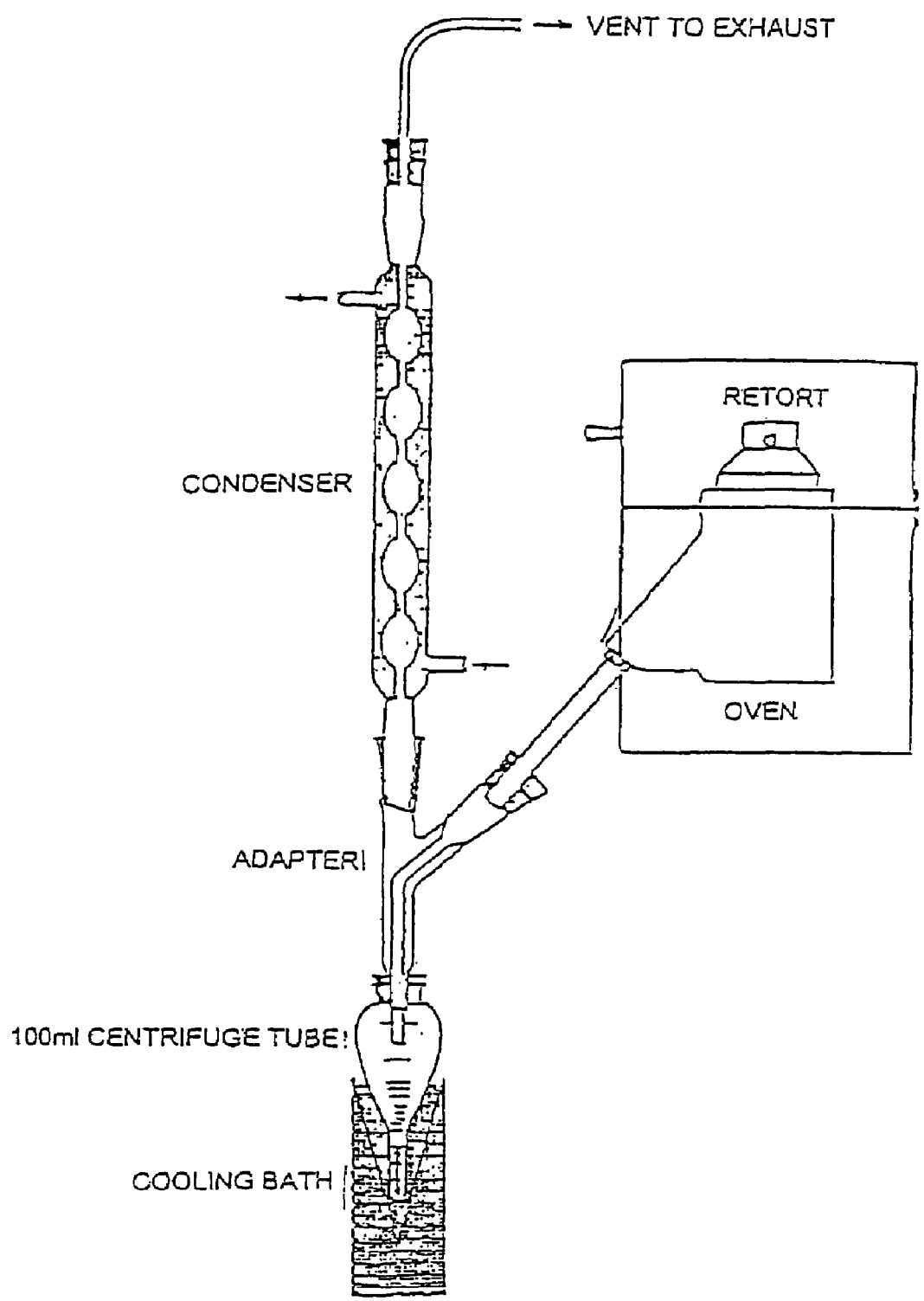

FIG. 8 is a Fisher Assay apparatus assembly; its full description and principles of operation are given in ASTM D3904-80.

DESCRIPTION OF THE PREFERRED EMBODIMENTS

The sewage sludge employed in the determination of process data using the continuous and batch-type apparatus of FIGS. 6, 7 respectively, which will be described below, is activated sewage sludge obtained from WWTP of Jerusalem. Proximate and ultimate analysis data is represented in Table 3.

TABLE 3

Ultimate and Proximate Analysis of the Sewage Sludge

| Moisture, % wt | Volatile solids/ % wt. db | Calorific value, Kcal/kg, db | Elemental analysis, % wt/% wt daf | | | | |
|---|---|---|---|---|---|---|---|
| | | | C | H | N | S | $O_{diff}$ |
| 79.0 | 68.5 | 3631 | 37.97/55.43 | 5.80/8.47 | 5.49/8.01 | 0.30/0.44 | 18.94/27.65 |

The sewage sludge was oven dried at 105° C. to about 100% solids, ground to a particle size of less than 0.75 mm for batch-scale experiments and of less than 0.25 mm for continuous operating tests, mixed with solvent in an appropriate ratio, and the mixture was immediately used in the experiment.

Figure 6A:
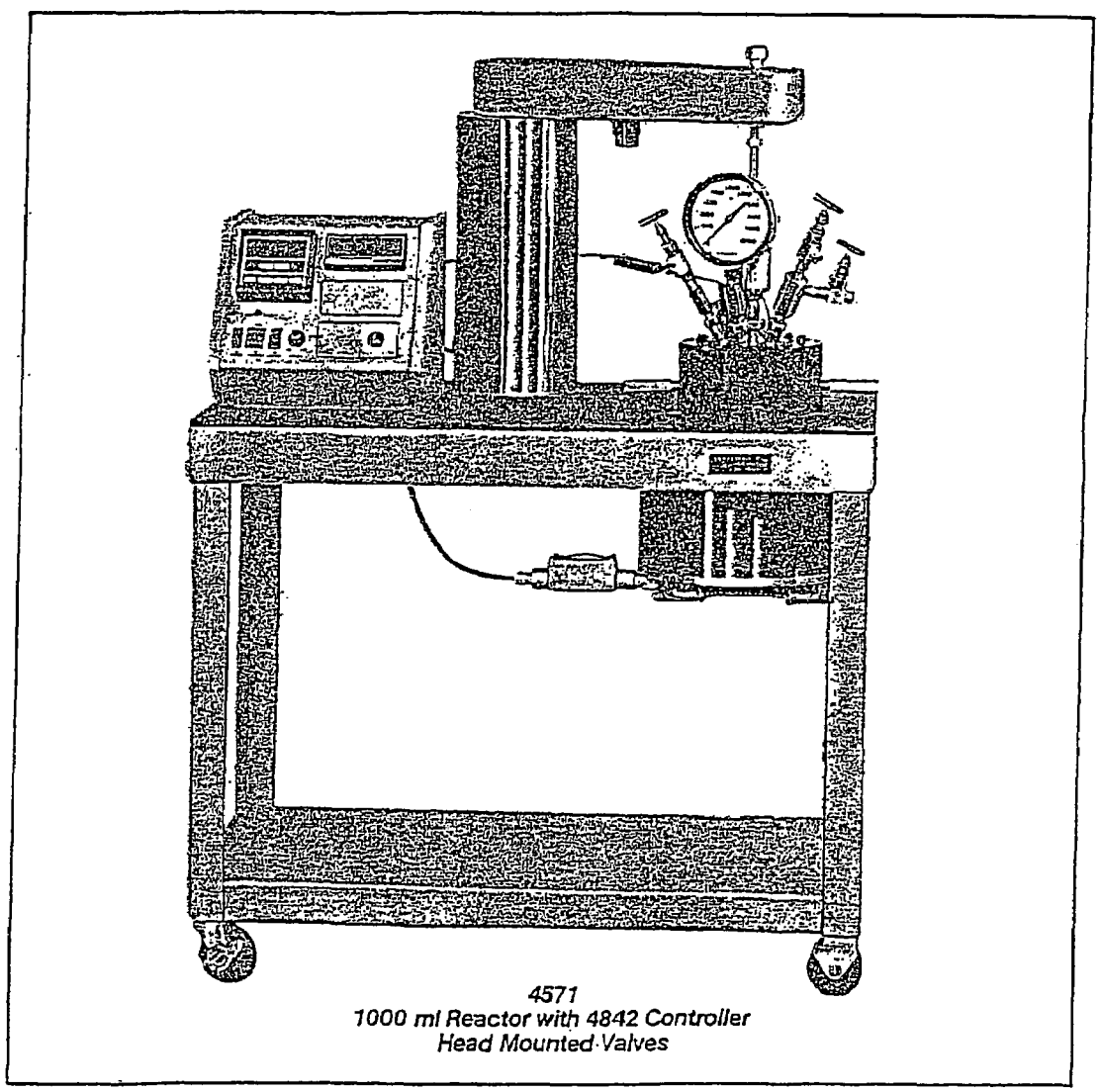
FIG. 6 is a 1000 ml high pressure/high temperature stirred reactor. This HP/HT system provides excellent facilities for conducting pre-pilot plant studies and for producing complex chemicals in more reasonable quantities than are usually available in laboratory reactors. The unit is completely equipped with all necessary fittings for handling and mixing liquids, slurries and gases under heat and pressure with vigorous stirring, including provisions for adding or withdrawing gas or liquid during a procedure. An automatic temperature controller with appropriate safety features and optional devices for monitoring the reaction pressure and temperature is furnished.
Figure 6B:
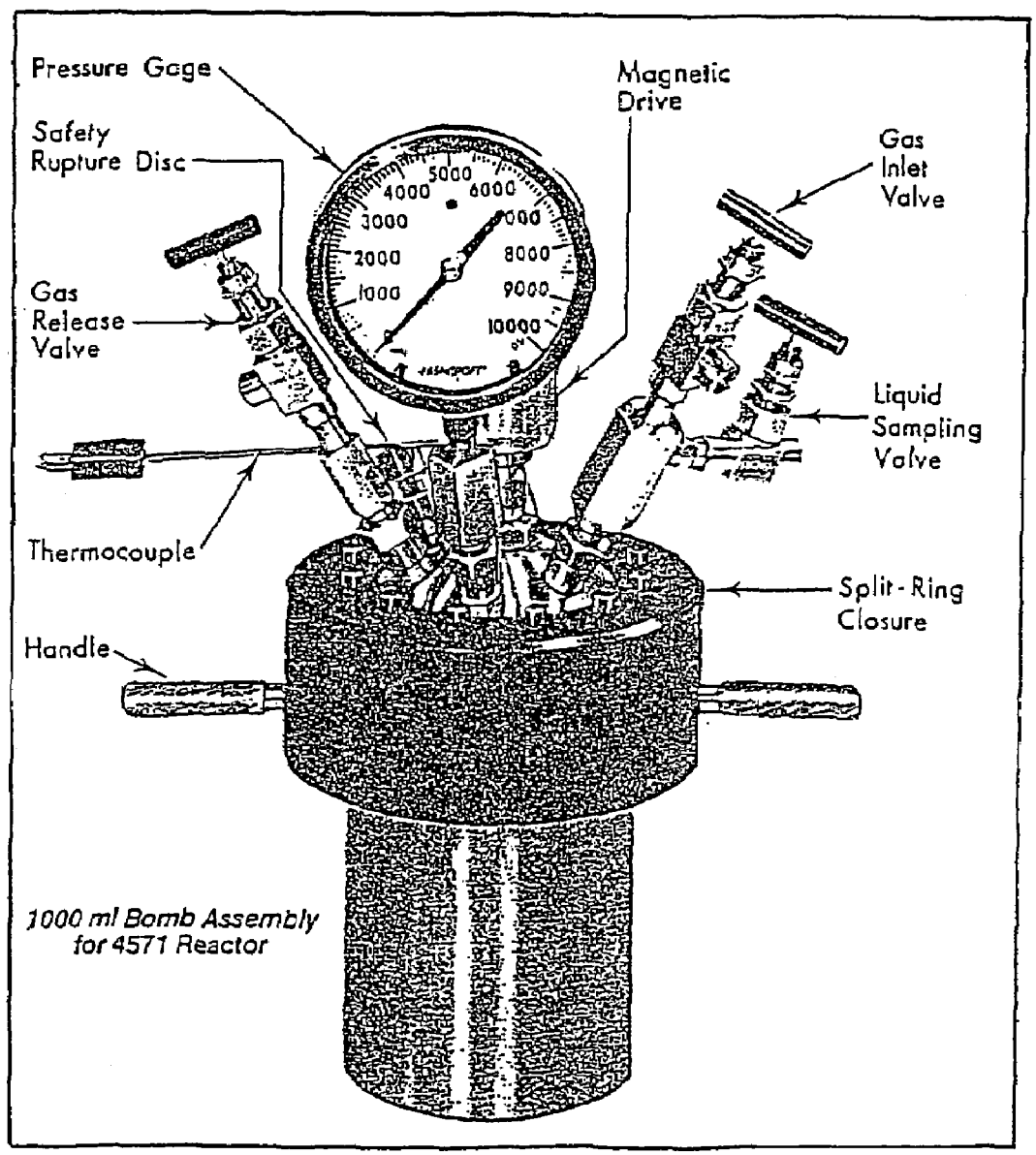
Figure 7:
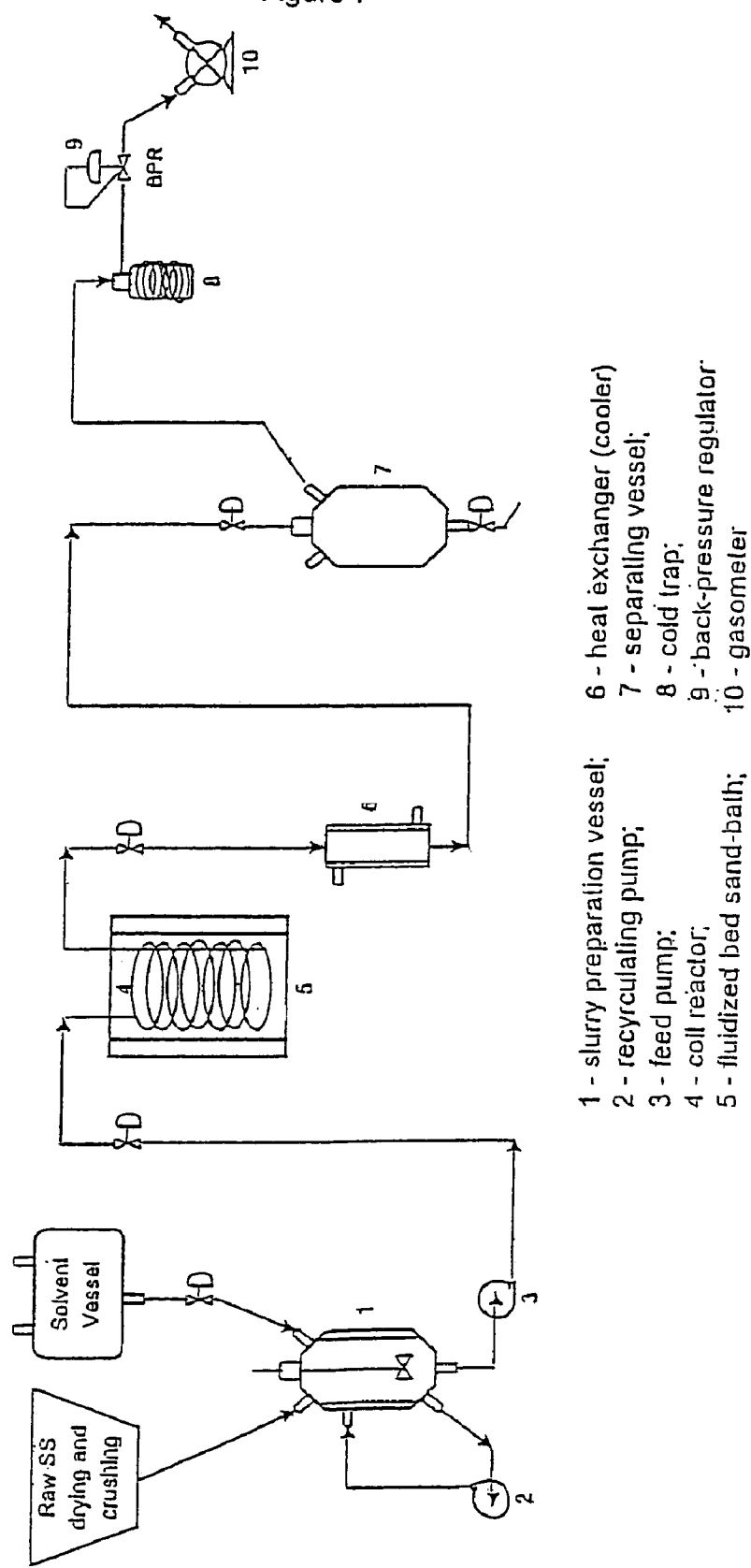
FIG. 7 is a schematic flow sheet of the thermal extraction unit. To perform an experiment on this unit, a mixture of dried sewage sludge and the solvent is prepared beforehand in the required proportion and quantitatively placed into slurry preparation vessel 1, said vessel comprising a mixer, a heating jacket and a recirculation pump 2. Heating, the recirculation pump and the mixer are turned on—all for obtaining a homogeneous slurry and preventing the precipitation of solid particles.

Prior to the operation of the continuous thermal extraction process unit of FIG. 7 a batch reactor unit of FIG. 6 was used to generate process data.

For autoclave experiments the pretreated sludge was loaded into the autoclave, the lid was fastened and the reactor was blown down with nitrogen three times to create inert atmosphere. Then the mixer and the controller-set heating program were activated. After the program was completed, heating was turned off and cooling turned on. When cooling ended, the uncondensed gas was withdrawn through the gas outlet valve and the gasometer to determine the volume of the gas obtained. During gas withdrawal samples were taken for G.C. analysis. Then the autoclave was opened and its content washed quantitatively with a great amount of the tetrahydrofuran (THF) solvent into a vessel, transported to the Soxhlet apparatus thimble and washed with THF till the liquid products were fully separated from the solid residue. The solid residue was oven-dried at 105° C. to remove THF and then weighed. The THF oil extract was distilled in Rotavapor to separate liquid products from the solvent (THF) and weighed.

The continuously operating unit for thermal extraction process shown in FIG. 7 was described previously.

In as much as we did not have a continuously-operating unit for a combined continuous process, each stage of the process was done separately: the thermal extraction stage in autoclave (FIG. 6) or a continuous unit (FIG. 7) and the pyrolysis stage of the slurry product obtained at the first stage, in the Fisher Assay apparatus.

The dried comminuted sludge is mixed with suitable solvent in the necessary ratio and placed into slurry preparation vessel 1 to obtain stable slurry (FIG. 7). After the slurry is stabilized by heating, stirring and recirculating, it is pumped by the feed pump 3 into Reactor 4, which has been preheated to a set temperature. The residence time spent in the reactor is regulated by the rate of flow through the feed pump.

In the reactor the sewage sludge is converted into a mixture of the slurry product and the gases produced in the process. From the reactor said mixture goes to separator vessel 7, where it is cooled and vapors are condensed. The uncondensed gas is released through the cold trap where the remaining liquids are trapped, then it passes through the gasometer and is thrown to vent. The slurry product collected in the separator vessel is vacuum-distilled in a laboratory unit and the liquid products having the boiling point at ≦250° C. are separated. The residual slurry product is placed into the retort of the Fisher Assay apparatus for pyrolysis, which is the second stage of the combined process. A program development controller device is included into the Fisher Assay apparatus to set the operation modes and regulate the following parameters:

The rate of raising reaction temperature to set values, hr;

Temperature, ° C.;

Soaking at set temperature, min.

Thermal Extraction Process Performance in the Batch Reactor

The operation conditions and results of the tests are shown in Table 4, the elemental analysis of the obtained oil and solid residues are shown in Table 5, and gas volume and composition for each test are shown in Table 6. All the data in the tables is presented on the basis of dry sludge.

Effect of Solvent Origin

Figure 4:
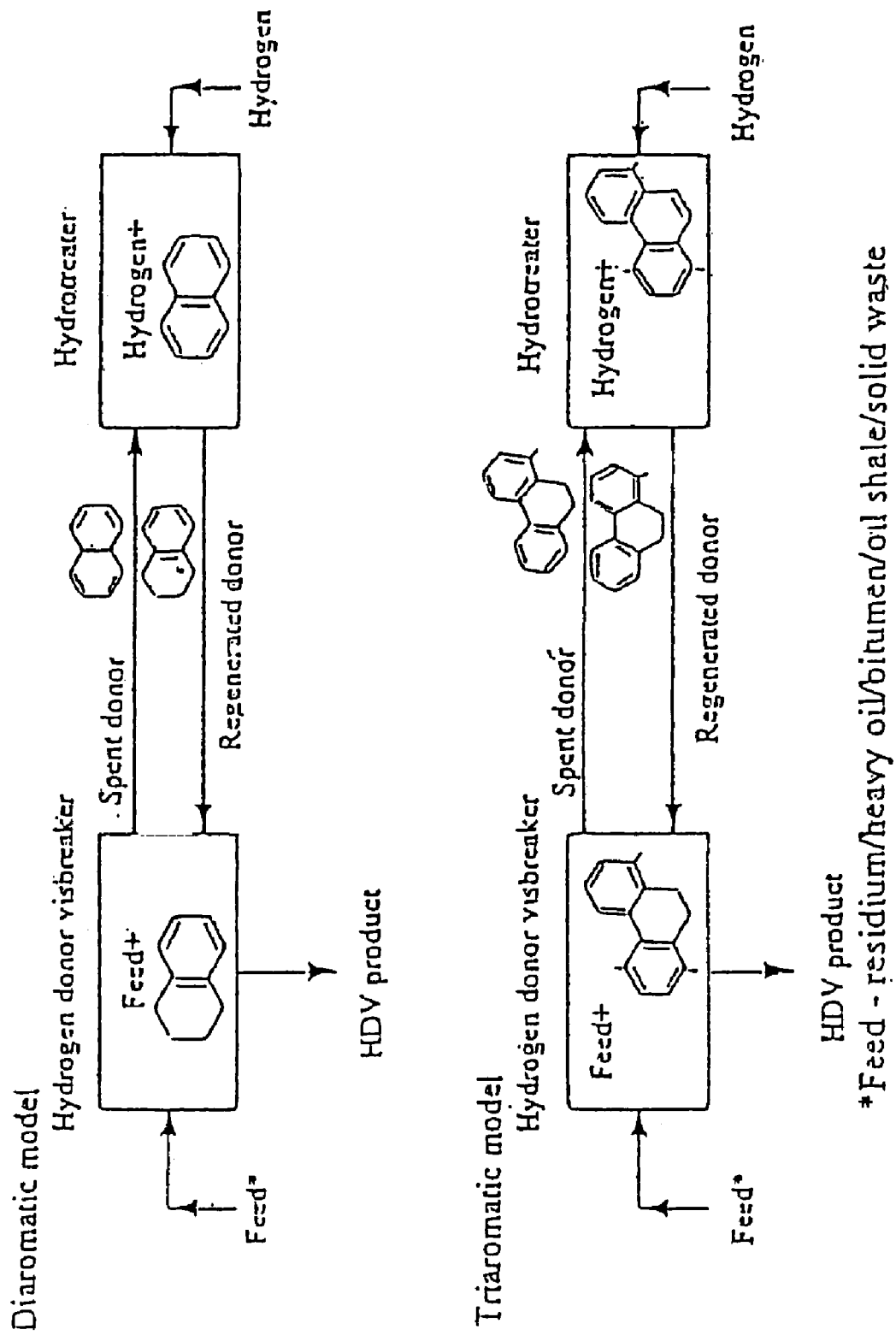
FIG. 4 shows reaction scheme chemistry in the presence of hydrogen donor.

The quality of the solvent is universally known to be of major importance for obtaining high yields of liquid products in the process of their thermal extraction from solid fossil fuels. The function of the H-donor recirculating solvent was discussed previously. When studying the thermal extraction process, tetralin is used as a model solvent; its chemistry was described and is illustrated in a diagram (FIG. 4). Therefore the first experiments to determine the limits of the process parameters were conducted with tetralin as solvent (experiments 1-6, Table 4). In these experiments, the variable parameters were temperature and the feed stock/solvent ratio. The experiments with tetralin (experiments 1-6) have shown that the best results are received at 350° C. and 1:1 feed stock/solvent ratio (TE4 experiment).

TABLE 4

Thermal Extraction experiments (autoclave tests).

| Test code | Feed stock g | Solvent g | T, ° C. | Residence time, min | Receipt, g | | | Yield of products, % wt | | |
|---|---|---|---|---|---|---|---|---|---|---|
| | | | | | Oil | Gas | Residue | Oil | Gas | Residue |
| TE1 | SS dry, 60 | Tetraline, 30 | 300 | 20 | 28.70 | 2.89 | 28.41 | 47.8 | 4.8 | 47.4 |
| TE2 | SS dry, 60 | Tetraline, 45 | 300 | 20 | 29.42 | 3.69 | 26.89 | 49.0 | 6.2 | 44.8 |
| TE3 | SS dry, 60 | Tetraline, 78 | 300 | 20 | 28.80 | 3.48 | 27.72 | 48.0 | 5.8 | 46.2 |
| TE6 | SS dry, 60 | Tetraline, 60 | 275 | 20 | 27.21 | 2.75 | 30.04 | 45.4 | 4.6 | 50.1 |
| TE4 | SS dry, 60 | Tetraline, 60 | 350 | 20 | 31.01 | 4.41 | 24.58 | 51.7 | 7.4 | 41.0 |
| TE5 | SS dry. 60 | Tetraline, 60 | 375 | 20 | 30.86 | 5.51 | 23.63 | 51.4 | 9.2 | 39.4 |
| TE7 | SS dry, 60 | SO/1, 60 | 275 | 20 | 85.54 | 3.38 | 31.08 | 42.6 | 5.6 | 51.8 |
| TE8 | SS dry, 60 | SO/1, 60 | 300 | 20 | 87.10 | 4.45 | 28.45 | 45.2 | 7.4 | 47.4 |
| TE9 | SS dry, 60 | SO/1, 60 | 325 | 20 | 87.38 | 5.06 | 27.56 | 45.6 | 8.4 | 45.9 |
| TE10 | SS dry, 60 | SO/1, 60 | 350 | 20 | 88.49 | 4.96 | 26.55 | 47.5 | 8.3 | 44.3 |
| TE13 | SS dry, 60 | SO/1, 60 | 375 | 20 | 86.80 | 6.50 | 26.70 | 44.7 | 10.8 | 44.5 |
| TE11 | SS dry, 60 | Mazut, 60 | 300 | 20 | 85.03 | 4.68 | 30.29 | 41.7 | 7.8 | 50.5 |
| TE12 | SS dry, 60 | Mazut, 60 | 350 | 20 | 86.95 | 5.28 | 27.77 | 44.9 | 8.8 | 46.3 |
| TE14 | SS dry, 60 | Mazut, 60 | 375 | 20 | 87.09 | 5.91 | 27.00 | 45.2 | 9.9 | 45.0 |
| TE16 | SS dry, 60 | SO/2, 60 | 325 | 20 | 89.10 | 4.64 | 26.26 | 48.5 | 7.7 | 43.8 |
| TE15 | SS dry, 60 | SO/2, 60 | 350 | 10 | 89.14 | 5.32 | 25.54 | 48.6 | 8.9 | 42.6 |
| TE17 | SS dry, 60 | SO/2, 60 | 350 | 20 | 89.34 | 4.91 | 25.75 | 48.9 | 8.2 | 42.9 |
| TE19 | SS dry, 60 | SSO/5, 60 | 300 | 20 | 89.17 | 4.31 | 26.52 | 48.6 | 7.2 | 44.2 |
| TE18 | SS dry, 60 | SSO/5, 60 | 350 | 20 | 90.43 | 5.82 | 23.75 | 50.7 | 9.7 | 39.6 |
| TE20 | SS dry, 60 | SSO/5, 60 | 375 | 20 | 87.54 | 6.82 | 25.64 | 45.9 | 11.4 | 42.7 |

TABLE 5

Elemental analysis of liquid and solid products (for TE autoclave tests).

| Test code | Liquid products, % wt | | | | | | | Solid products, % wt | | | | | | | |
|---|---|---|---|---|---|---|---|---|---|---|---|---|---|---|---|
| | C | H | N | S | $O_{diff}$ | H/C | Q, Kcal/kg | O.M. | C | H | N | S | $O_{diff}$ | H/C | Q, Kcal/kg |
| TE1 | 79.22 | 9.02 | 5.20 | 0.19 | 6.37 | 1.37 | 8475.1 | 32.71 | 19.44 | 1.86 | 2.90 | 0.41 | 8.10 | 1.15 | 1832.26 |
| TE2 | 76.40 | 9.16 | 5.58 | 0.20 | 8.66 | 1.44 | 8221.8 | 33.45 | 20.02 | 2.02 | 3.10 | 0.37 | 7.94 | 1.21 | 1921.72 |
| TE3 | 75.86 | 9.23 | 5.66 | 0.18 | 9.07 | 1.46 | 8184.1 | 35.25 | 21.15 | 2.23 | 3.42 | 0.36 | 0.09 | 1.27 | 2060.75 |
| TE6 | 76.55 | 9.52 | 5.41 | 0.17 | 8.35 | 1.49 | 8329.8 | 36.65 | 22.84 | 2.48 | 3.66 | 0.43 | 7.24 | 1.30 | 2283.06 |
| TE4 | 79.22 | 9.16 | 5.25 | 0.18 | 6.19 | 1.39 | 8513.9 | 24.68 | 16.54 | 1.58 | 2.48 | 0.33 | 3.75 | 1.15 | 1639.50 |
| TE5 | 80.52 | 9.30 | 5.15 | 0.14 | 4.89 | 1.39 | 8686.4 | n.d. | 13.84 | 1.21 | 2.12 | n.d. | n.d. | 1.05 | n.d. |
| TE7 | 78.27 | 10.88 | 1.54 | 1.60 | 7.71 | 1.67 | 8857.5 | 38.21 | 24.14 | 2.56 | 3.82 | 2.18 | 5.51 | 1.27 | 2498.52 |
| TE8 | 79.20 | 10.62 | 1.67 | 1.61 | 6.90 | 1.61 | 8890.2 | 31.72 | 21.46 | 2.12 | 3.28 | 1.96 | 2.90 | 1.19 | 2235.34 |
| TE9 | 78.42 | 10.73 | 1.98 | 1.42 | 7.45 | 1.64 | 8834.8 | 29.10 | 20.84 | 1.95 | 3.12 | 1.92 | 1.27 | 1.12 | 2184.64 |
| TE10 | 80.24 | 10.28 | 2.03 | 2.53 | 4.92 | 1.54 | 8966.2 | 28.79 | 20.43 | 1.91 | 3.03 | 1.87 | 1.55 | 1.12 | 2133.01 |
| TE13 | 80.26 | 10.40 | 1.90 | 1.32 | 6.12 | 1.55 | 8934.7 | 29.00 | 20.98 | 1.84 | 3.09 | 1.62 | 1.47 | 1.05 | 2155.92 |
| TE11 | 81.76 | 10.52 | 1.29 | 0.35 | 6.08 | 1.54 | 9061.5 | 37.68 | 26.74 | 2.52 | 4.20 | 0.57 | 3.65 | 1.13 | 2705.78 |
| TE12 | 82.18 | 10.47 | 1.57 | 0.32 | 5.46 | 1.53 | 9098.6 | 29.96 | 22.38 | 2.03 | 3.31 | 0.44 | 1.80 | 1.09 | 2276.80 |
| TE14 | 83.10 | 10.48 | 1.78 | 0.27 | 4.37 | 1.51 | 9202.6 | 29.46 | 22.24 | 1.93 | 3.30 | 0.33 | 1.66 | 1.04 | 2241.64 |
| TE16 | 78.30 | 9.94 | 2.20 | 1.65 | 7.91 | 1.52 | 8624.8 | 28.46 | 20.76 | 2.08 | 3.10 | 0.98 | 1.54 | 1.20 | 2178.60 |
| TE15 | 79.10 | 10.26 | 2.28 | 1.58 | 6.78 | 1.56 | 8795.9 | 25.47 | 17.80 | 1.76 | 2.73 | 0.84 | 2.34 | 1.19 | 1835.76 |
| TE17 | 81.09 | 10.76 | 1.86 | 1.61 | 4.68 | 1.59 | 9135.4 | 28.84 | 19.90 | 2.25 | 3.08 | 0.81 | 2.80 | 1.36 | 2113.66 |
| TE19 | 75.83 | 10.26 | 5.48 | 0.12 | 8.31 | 1.62 | 8453.3 | 20.54 | 15.29 | 1.60 | 2.30 | 0.24 | 1.11 | 1.26 | 1609.47 |
| TE18 | 76.10 | 10.14 | 5.65 | 0.14 | 7.97 | 1.60 | 8455.0 | 19.67 | 14.64 | 1.53 | 2.21 | 0.22 | 1.07 | 1.25 | 1540.12 |
| TE20 | 79.14 | 10.32 | 5.18 | 0.09 | 5.27 | 1.56 | 8814.4 | 18.78 | 14.32 | 1.47 | 2.18 | 0.21 | 0.60 | 1.23 | 1511.40 |

TABLE 6

Data of gas chromatography analysis (autoclave tests).

| Test code | Gas volume, L | Gas composition, % vol | | | | | | | | | | | | | | Q, Kcal/kg |
|---|---|---|---|---|---|---|---|---|---|---|---|---|---|---|---|---|
| | | $H_2$ | CO | $CO_2$ | $H_2S$ | $CH_4$ | $C_2H_4$ | $C_2H_6$ | $C_3H_6$ | $C_3H_8$ | $C_4H_8$ | $C_4H_{10}$ | $C_5$ | $C_6$ | | |
| TE1 | 1.62 | 1.47 | 5.49 | 80.19 | 1.58 | 4.68 | 0.57 | 1.12 | 0.33 | 1.23 | 0.74 | 0.29 | 0.06 | 0.09 | | 753.8 |
| TE2 | 1.98 | 0.68 | 4.18 | 88.58 | 1.65 | 1.69 | 0.46 | 0.27 | 0.17 | 0.33 | 0.45 | 0.09 | 0.03 | 0.00 | | 313.1 |
| TE3 | 1.88 | 0.51 | 3.97 | 88.67 | 1.65 | 1.20 | 0.43 | 0.20 | 0.14 | 0.22 | 0.42 | 0.05 | 0.01 | 0.00 | | 256.5 |
| TE6 | 1.47 | 0.50 | 3.31 | 92.14 | 0.11 | 0.59 | 0.32 | 0.10 | 0.11 | 0.11 | 0.16 | 0.03 | 0.01 | 0.00 | | 159.4 |
| TE4 | 2.45 | 1.50 | 5.70 | 82.69 | 0.97 | 4.90 | 0.52 | 0.98 | 0.31 | 0.78 | 0.24 | 0.24 | 0.07 | 0.00 | | 638.8 |
| TE5 | 3.21 | 4.01 | 6.24 | 73.60 | 1.27 | 7.51 | 0.55 | 2.51 | 0.49 | 2.08 | 0.40 | 0.45 | 0.08 | 0.01 | | 1183.7 |
| TE7 | 1.80 | 0.44 | 3.60 | 91.52 | 0.50 | 1.19 | 0.38 | 0.22 | 0.15 | 0.21 | 0.07 | 0.05 | 0.03 | 0.00 | | 213.2 |
| TE8 | 2.37 | 0.51 | 3.81 | 90.23 | 1.27 | 1.78 | 0.40 | 0.36 | 0.21 | 0.38 | 0.12 | 0.08 | 0.03 | 0.00 | | 286.5 |
| TE9 | 2.77 | 0.52 | 4.57 | 83.40 | 3.57 | 3.55 | 0.43 | 0.70 | 0.30 | 0.79 | 0.30 | 0.19 | 0.09 | 0.02 | | 504.4 |
| TE10 | 2.75 | 0.80 | 5.35 | 79.14 | 4.38 | 5.59 | 0.42 | 1.26 | 0.42 | 1.30 | 0.33 | 0.25 | 0.10 | 0.03 | | 748.6 |
| TE13 | 3.81 | 1.93 | 6.34 | 66.59 | 6.99 | 9.26 | 0.52 | 2.81 | 0.76 | 2.56 | 0.72 | 0.30 | 0.27 | 0.07 | | 1391.9 |
| TE11 | 2.49 | 0.41 | 3.42 | 91.66 | 0.39 | 1.17 | 0.35 | 0.19 | 0.18 | 0.25 | 0.12 | 0.08 | 0.04 | 0.00 | | 218.4 |
| TE12 | 2.92 | 1.12 | 4.45 | 83.25 | 0.74 | 5.23 | 0.43 | 0.96 | 0.38 | 1.37 | 0.26 | 0.10 | 0.03 | | | 680.2 |
| TE14 | 3.35 | 2.19 | 4.83 | 76.34 | 1.65 | 7.38 | 0.49 | 2.16 | 0.59 | 2.24 | 0.54 | 0.46 | 0.26 | 0.05 | | 1121.6 |
| TE16 | 2.54 | 0.45 | 4.42 | 82.71 | 4.54 | 4.02 | 0.46 | 0.74 | 0.30 | 0.75 | 0.22 | 0.15 | 0.07 | 0.04 | | 514.0 |
| TE15 | 3.02 | 0.82 | 5.58 | 72.59 | 7.41 | 7.23 | 0.55 | 1.72 | 0.56 | 1.71 | 0.46 | 0.34 | 0.16 | 0.06 | | 987.5 |
| TE17 | 2.75 | 0.87 | 5.60 | 75.78 | 7.28 | 5.93 | 0.43 | 1.26 | 0.40 | 1.25 | 0.30 | 0.23 | 0.10 | 0.06 | | 766.5 |
| TE19 | 2.95 | 0.57 | 4.64 | 87.93 | 1.19 | 1.82 | 0.48 | 0.39 | 0.27 | 0.47 | 0.14 | 0.12 | 0.06 | 0.02 | | 353.7 |
| TE18 | 3.26 | 1.42 | 7.48 | 75.40 | 1.99 | 6.07 | 0.51 | 1.60 | 0.53 | 2.46 | 0.69 | 0.80 | 0.29 | 0.06 | | 1091.3 |
| TE20 | 3.57 | 1.54 | 5.68 | 75.18 | 1.88 | 8.44 | 0.53 | 1.94 | 0.78 | 2.31 | 0.76 | 0.48 | 0.23 | 0.06 | | 1179.7 |

TABLE 7

Elemental analysis of feed and solvents.

| Sample code | Sample origin | Elemental analysis, % wt | | | | | | Q, Kcal/kg |
|---|---|---|---|---|---|---|---|---|
| | | C | H | N | S | Odiff. | H/C | |
| M | mazut from crude oil | 87.87 | 10.70 | 0.40 | 0.36 | 0.67 | 1.46 | 9741.6 |
| SO1 | retort. shale oil, tr. 250-400° C. (old) | 82.75 | 10.56 | 0.58 | 5.00 | 1.11 | 1.53 | 9401.7 |
| SO2 | retort. shale oil, tr. 250-400° C. (fresh) | 80.64 | 10.70 | 0.63 | 6.58 | 1.45 | 1.59 | 9297.4 |
| SSO | retorting oil from SS | 80.16 | 12.05 | 6.30 | 0.19 | 1.30 | 1.80 | 9428.4 |
| SSO/5 | retort. oil from SS. tr. 300-350° C. | 76.94 | 10.34 | 6.99 | 0.18 | 5.55 | 1.61 | 8636.2 |
| SSO/6 | retort. oil from SS. tr. >350° C. | 80.68 | 11.30 | 4.19 | 0.41 | 3.42 | 1.68 | 9236.6 |
| SS | sewage sludge (ash = 31.5%) | 37.97 | 5.80 | 5.49 | 0.30 | 18.94 | 1.63 | 4017.7 |

As is known in the professional literature, fractions of crude oil, shale oil or syncrudes obtained from coal are used as H-donor solvents to liquefy solid fuels by thermal extraction in the H-donor solvent medium. As a rule, the recirculating solvent is a certain fraction or a mixture of several fractions of the liquefied product proper. Such a solvent has the highest H-donor activity for the said feedstock and the highest solubility toward the newly formed liquid products. Therefore, solvents of different origin were used in the experiments described. Table 7 provides the elemental composition of the various solvents used in said experiments.

The experiments with said solvents were conducted in the 275-375° C. temperature range and with the 1:1 feed stock/solvent ratio. As can be seen from Table 4, the liquid product yield closest to tetralin was received in the solvent medium obtained by prolysis of sewage sludge and distilled, in the 300-350° C. range (experiments TE18, TE19 and TE20). The highest yield of liquid products was registered in the TE18 experiment (50.7% wt).

the experiments were conducted, especially on temperature. With the raising of the temperature, the H/C ratio in the liquid products and the calorific value increased (experiments TE18, TE19 and TE20), while the H/C ratio and the calorific value of the solid residue decreased. In the gaseous products (Table 6), heating brings the $CO_2$ share in the gas down while the share of combustible gases ($H_2$, CO and $C_nH_m$) and their calorific value is correspondingly rising.

Experiments with sewage sludge pyrolysis in different conditions were carried out to compare the efficiency of pyrolysis to that of thermal extraction in the H-donor solvent medium. The data on pyrolysis are cited in Table 8. The maximum yield of liquid products was received in the P13 experiment at 450° C. after 0.5 hr temperature rise (25.5% wt), which is half the optimal yield of liquid products in the thermal extraction process (Table 4, experiment TE18). Table 8 shows that the higher the rate of temperature rise, the higher the liquid products yield (experiments P1, P5, P9), and the optimal pyrolysis temperature is 450° C. (experiment P13).

TABLE 8

Fisher Assay Experiments*

| Test code | Test conditions | | Recieved, gr | | | | Yield of products, % wt | | |
|---|---|---|---|---|---|---|---|---|---|
| | T, ° C. | Time of temp. raising, hours | Oil | Water | Gas | Residue | Oil | Gas | Residue |
| P1 | 400 | 2 | 17.4 | 13.5 | 6.0 | 43.1 | 21.8 | 7.5 | 53.8 |
| P5 | 400 | 1 | 17.5 | 13.8 | 5.9 | 42.8 | 21.9 | 7.4 | 53.4 |
| P9 | 400 | 0.5 | 18.5 | 13.3 | 6.0 | 42.2 | 23.1 | 7.5 | 52.8 |
| P13 | 450 | 0.5 | 20.4 | 13.0 | 6.6 | 40.0 | 25.5 | 8.3 | 49.9 |
| P17 | 500 | 0.5 | 20.2 | 12.0 | 8.7 | 39.1 | 25.3 | 10.9 | 48.8 |

*Feed stock: SS dry, charge - 80 gr.

Tables 5 and 6 show, respectively, the elemental composition of the liquid and solid products and the composition of the gas released during the experiments. The tables also give the computed calorific value of the products obtained. The calorific value was computed from the Mendeleyev formula for gaseous products (kcal/kg):

$$Q=(30.4CO+25.8H_2+85.3CH_4+143.2C_2H_4+136.0C_2H_2+170.0C_nH_m)/q$$

in which CO, $H_2$, $CH_4$, $C_2H_4$, $C_2H_2$ and $C_nH_m$ is the percent of the respective gases by volume; where q is density of the gas mixture, kg/m$^3$.

For liquid and solid products (kcal/kg).

$$Q=81C+300H-26(O-S)-6(9H+H_2O),$$

In which C, H, S, O and $H_2O$ is the percent of said elements and water in the product by weight.

As can be seen from Tables 5 and 6, the composition of the products sufficiently depends on the conditions in which The yield of liquid products during pyrolysis as compared to thermal extraction decreases, while the yield of solid residue, more specifically, of residual organic matter, increases. This is accounted for by the coke formation processes taking place at high temperatures of pyrolysis, which is facilitated by atomic hydrogen deficit in the reaction mixture.

A decrease in the yield of the liquid products improves their qualitative indices (see Table 9): the H/C atomic ratio and the calorific value rise. A greater share of the residual organic matter in solid residue also increases their calorific value (Table 9). The composition of the gas also changes depending on pyrolysis conditions (Table 10): The volume of the released gas increases as the temperature rises, the share of combustible gas goes up and the share of $CO_2$, goes down, which also increases the calorific value.

TABLE 9

Elemental analysis of liquid and solid products (for FA tests)

| Test code | Liquid products, % wt | | | | | | | Solid products, % wt | | | | | | | |
|---|---|---|---|---|---|---|---|---|---|---|---|---|---|---|---|
| | C | H | N | S | O$_{diff}$ | H/C | Q, Kcal/kg | O.M. | C | H | N | S | O$_{diff}$ | H/C | Q, Kcal/kg |
| P1 | 80.76 | 12.30 | 3.76 | 0.49 | 2.69 | 1.83 | 9510.2 | 44.7 | 33.58 | 2.38 | 4.59 | 0.68 | 3.48 | 0.85 | 3232.7 |
| P5 | 81.92 | 12.26 | 2.65 | 0.59 | 2.58 | 1.80 | 9599.7 | 43.4 | 34.04 | 2.30 | 4.71 | 0.54 | 1.83 | 0.81 | 3289.5 |

TABLE 9-continued

Elemental analysis of liquid and solid products (for FA tests)

| Test code | Liquid products, % wt | | | | | | | Solid products, % wt | | | | | | | |
|---|---|---|---|---|---|---|---|---|---|---|---|---|---|---|---|
| | C | H | N | S | $O_{diff}$ | H/C | Q, Kcal/kg | O.M. | C | H | N | S | $O_{diff}$ | H/C | Q, Kcal/kg |
| P9  | 81.10 | 12.11 | 2.22 | 0.65 | 3.92 | 1.79 | 9463.1 | 40.3 | 33.18 | 2.40 | 4.56 | 0.11 | 0.02 | 0.87 | 3280.3 |
| P13 | 80.06 | 12.19 | 2.85 | 0.51 | 4.39 | 1.83 | 9382.7 | 36.8 | 29.70 | 1.62 | 4.75 | 0.31 | 0.37 | 0.65 | 2802.7 |
| P17 | 79.32 | 11.20 | 2.59 | 0.57 | 6.32 | 1.69 | 9030.6 | 35.5 | 29.02 | 1.20 | 4.17 | 0.49 | 0.59 | 0.50 | 2643.2 |

TABLE 10

Date of gas chromatography analysis (for FA tests).

| Test code | Gas volume, L | Gas composition, % vol | | | | | | | | | | | | | Q, Kcal/kg |
|---|---|---|---|---|---|---|---|---|---|---|---|---|---|---|---|
| | | $H_2$ | CO | $CO_2$ | $H_2S$ | $CH_4$ | $C_2H_4$ | $C_2H_6$ | $C_3H_6$ | $C_3H_8$ | $C_4H_8$ | $C_4H_{10}$ | $C_5$ | $C_6$ | |
| P1  | 3.45 | 1.07 | 6.31 | 74.26 | 7.22 | 5.35  | 0.53 | 0.86 | 0.45 | 1.20 | 1.15 | 0.34 | 0.14 | 0.00 | 808.6  |
| P5  | 3.35 | 0.84 | 6.71 | 72.10 | 8.70 | 5.35  | 0.82 | 0.83 | 0.47 | 1.18 | 0.64 | 0.41 | 0.30 | 0.05 | 804.6  |
| P9  | 3.50 | 1.14 | 6.24 | 71.10 | 8.14 | 5.66  | 0.62 | 1.13 | 0.58 | 1.41 | 1.37 | 0.34 | 0.21 | 0.06 | 947.3  |
| P13 | 3.90 | 2.90 | 8.11 | 62.58 | 7.41 | 8.73  | 0.99 | 2.81 | 1.25 | 2.30 | 0.55 | 0.28 | 0.75 | 0.19 | 1541.6 |
| P17 | 5.67 | 7.60 | 8.35 | 49.90 | 5.73 | 14.76 | 1.53 | 4.29 | 1.79 | 2.65 | 1.32 | 0.57 | 0.89 | 0.27 | 2569.0 |

A comparative table below illustrates the advantages and disadvantages of the two methods of sewage sludge liquefaction—thermal extraction and pyrolysis:

TABLE 11

Advantages and Disadvantages of Liquefaction Method

| Liquefaction method | Advantages | Disadvantages |
|---|---|---|
| Thermal extraction in H-donor solvent medium | 1. High yield of liquid products 2. Absence of pyrolytic water in products 3. Higher conversion of sewage sludge organic matter into liquefied products | 1 The need to separate liquid products from solid residue. 2. Lower calorific value of products |
| Pyrolysis | 1. Higher calorific value of products 2. Separation of liquid products in vapor phase | 1. Low yield of liquid products 2. Conversion of part of organic matter into pyrolytic water |

Figure 5:
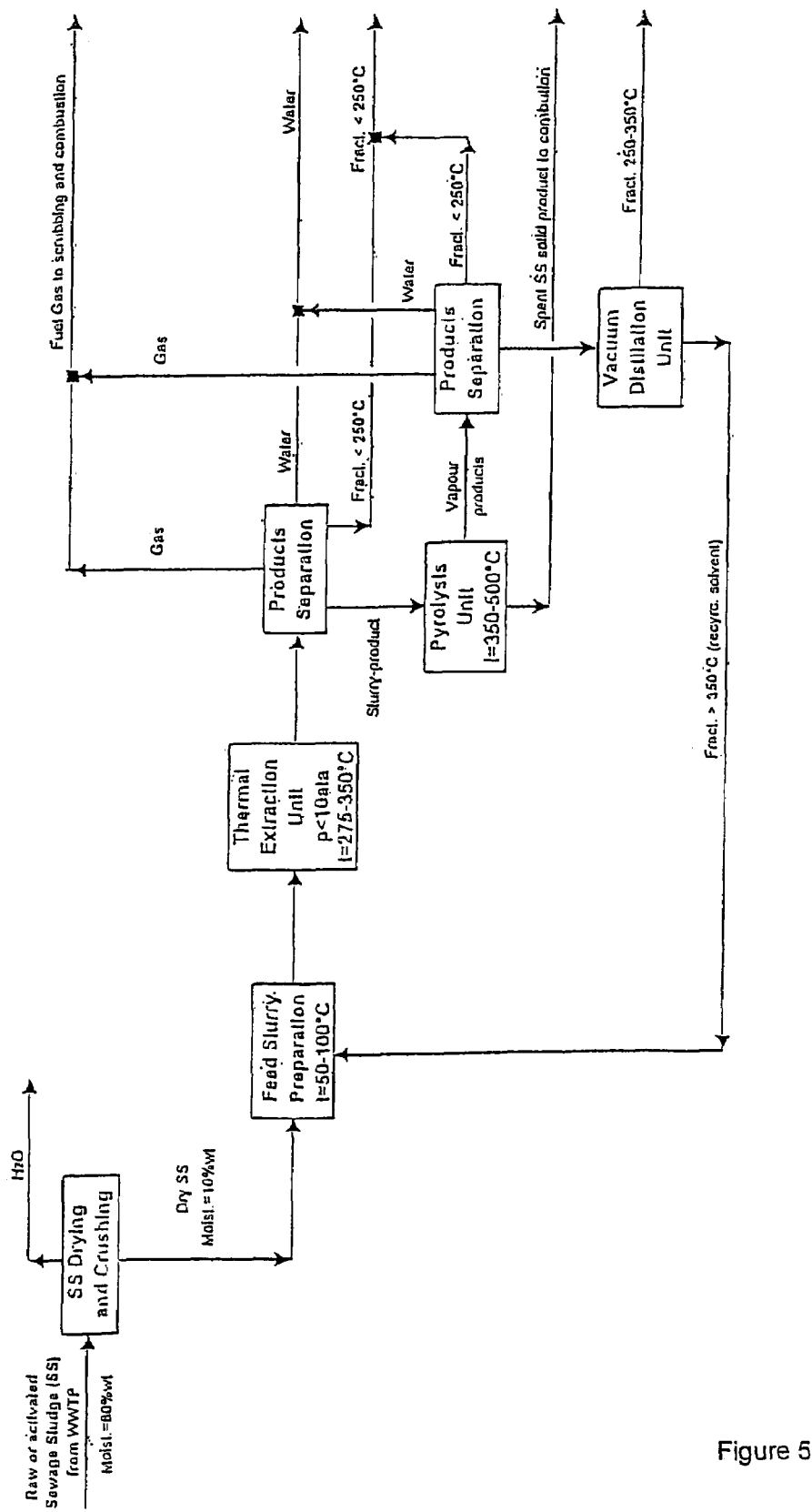
FIG. 5 is a schematic flow sheet of a two-stage sludge liquefaction process wherein the first stage is thermal extraction of feed stock in the recirculating solvent medium and the second stage is pyrolysis of the slurry product obtained at the first liquefaction stage, the second stage increasing the yield of liquid products and facilitating separation of the liquid products from the solid residue.

Comparing the advantages and disadvantages of the above methods generated the idea of using both in a combined process, which is the subject of this invention. A flow chart of the combined process according to this invention is given in FIG. 5.

In as much as a continuous unit to test the combined process was unavailable at this stage of the research, experiments simulating the process in question were conducted.

The thermal extraction stage was tested in a unit shown in FIG. 7, the operation of said unit was described above. The slurry product obtained in this unit was transported to a vacuum-distilling apparatus in which water and the liquid product fraction boiling at up to 250° C. were distilled off. The residual slurry product was then transported to the Fisher Assay apparatus for pyrolysis.

The thermal extraction stage proceeded in optimal conditions determined during autoclav tests: 350° C., 10.0 atm., residence time 15 min. The stage at which the slurry product was vacuum-distilled took place in 10 mm Hg vacuum. The stage of the slurry product pyrolysis of the remaining slurry-product was performed at 450° C. and time of temperature rising—0.5 hr. The results of the combined process and the computed yields after each liquefaction stage are summarized in Table 12.

TABLE 12

Combined Thermal Extraction-Pyrolysis Process (Balance and Conversions)

| In | Out |
|---|---|
| Step of thermal extraction(350° C.: 1:1:15 min) | |
| Feed slurry, including: 1125.0 gr - solvent 1125.0 gr - SSdry including: 770.6 gr O.M. 354.4 gr ash Total: 2250.0 g | 95.0 gr - gas Slurry-product 1, including: 1693.8 gr - oil 461.2 gr - solid residue, including: 106.8 gr O.M. 354.4 gr ash Total: 2250.0 gr |
| Conversions on dry basis: | |
| Total: | (1125.0 − 461.2)/1125.0 × 100 = 59.0% wt |
| Yield of liquids: | (1693.0 − 1125.0)/1125.0 × 100 = 50.56% wt |
| Yield of gas: | 95.0/1125.0 × 100 = 8.44% wt |
| Yield of solid residue: | 461.2/1125.0 × 100 = 41.0% wt |
| Conversions on dry ash free basis (daf): | |
| Total: | (770.6 − 106.8)/770.6 × 100 = 86.14% wt daf |
| Yield of liquids: | (1693.0 − 1125.0)/770.6 × 100 = 73.81% wt daf |
| Yield of gas: | 95.0/770.6 × 100 = 12.33% wt daf |
| Yield of solid residue: | 106.8/770.6 × 100 = 13.86% wt daf |
| Step of slurry-product 1 vacuum distillation | |
| Slurry-product 1, including: 1693.8 gr - oil 461.2 gr - solid residue | 220.16 gr - oil fraction <250° C. 1934.84 gr - slurry-product 2 remainder, including: 1473.64 gr oil fraction >250° C. 461.2 gr - solid residue |
| Total: 2155.0 gr | Total: 2155.0 gr |

TABLE 12-continued

Combined Thermal Extraction-Pyrolysis Process (Balance and Conversions)

Step of slurry-product 2 pyrolysis (by F.A., 450° C.)

| | |
|---|---|
| 1934.84 gr slurry-product 2, including: | 47.83 gr - gas |
| | 17.62 gr - water |
| 1473.64 gr oil fraction >250° C. | 1382.1 gr - oil |
| | 487.29 gr - solid residue, including: |
| 461.2 gr - solid residue | 132.89 gr O.M. |
| | 354.4 gr ash |
| Total: 1934.84 gr | Total: 1934.84 gr |

Balance and conversions for combined process:

| In | Out |
|---|---|
| 2250.0 gr feed slurry including: | 142.83 gr gas |
| | 17.62 gr water |
| 1125.0 gr solvent | 477.26 gr oil-product |
| 1125.0 gr SSdry including: | 1125.0 gr recyrc. solvent |
| | 487.29 gr solid residue including: |
| 770.6 gr O.M. | 132.89 gr O.M. |
| 354.4 gr ash | 354.4 gr ash |
| Total: 2250.0 gr | Total: 2250.0 gr |

Conversions (dry basis):

| | |
|---|---|
| Total: | $(1125.0 - 487.29)/1125.0 \times 100 = 56.68\%$ wt |
| Yield of oil: | $477.26/1125.0 \times 100 = 42.42\%$ wt |
| Yield of gas: | $142.83/1125.0 \times 100 = 12.70\%$ wt |
| Yield of pyr. water: | $17.62/1125.0 \times 100 = 1.57\%$ wt |
| Yield of solid residue: | $487.29/1125.0 \times 100 = 43.31\%$ wt |

Conversions (dry ash free basis):

| | |
|---|---|
| Total: | $(770.6 - 132.89)/770.6 \times 100 = 82.75\%$ wt daf |
| Yield of liquids: | $477.26/770.6 \times 100 = 61.93\%$ wt daf |
| Yield of gas: | $142.83/770.6 \times 100 = 18.53\%$ wt daf |
| Yield of pyr. water: | $17.62/770.6 \times 100 = 2.29\%$ wt daf |
| Yield of O.M. residue: | $132.39/770.6 \times 100 = 17.25\%$ wt daf |

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A multi-stage process for the treatment of organic waste comprising:
   (a) Drying said waste to reduce water content to below 15%;
   (b) Subjecting said dried waste to a thermochemical liquefaction process in the presence of a recirculating solvent medium at a temperature of about 275° C. to 375° C. and a pressure of up to 10 atmospheres, thereby obtaining gaseous, liquid and solid products;
   (c) Separating a formed slurry product from condensable gas, water and other liquid fractions boiling out at up to 250° C.;
   (d) Transferring said slurry product obtained from thermal extraction from step c to a pyrolysis apparatus and treating the same at a temperature of about 350° C. to 500° C. to cause additional thermal destruction of unconvertible organic matter of feed material and heavy liquid fractions obtained in step c and their evaporation and removal from pyrolysis apparatus;
   (e) Separating vapor products from condensable oil products;
   (f) Vacuum distillation of oil products from step e for the removal of fractions having a boiling temperature of between 250° C. and 350° C.; and
   (g) Recirculating a fraction having a boiling temperature of above 300° C. as the recirculating solvent medium for step b.

2. A multi-stage process according to claim 1 wherein said recirculating solvent medium is in itself a liquid product with a boiling temperature of above 300° C.

3. A multi-stage process according to claim 1 wherein said recirculating solvent medium serves as a hydrogen donor in step b.

4. A multi-stage process according to claim 1 wherein said organic waste, is sewage sludge.

5. A multi-stage process according to claim 1 wherein said waste is dried to reduce the water content to below 12%.

6. A multi-stage process according to claim 1 wherein the solvent and dried waste are present in a ratio of between 0.75:1 and 1.5:1.

7. A multi-stage process according to claim 1 wherein the solvent and dried waste are present in a ratio of about 1:1.

8. A multi-stage process according to claim 1, wherein step d is carried out at a temperature of about 450° C.

9. A multi-stage process according to claim 1 wherein step g is carried out by recirculating a fraction having a boiling temperature of above 350° C. as the recirculating solvent medium for step b.

* * * * *